United States Patent
Sorin et al.

(10) Patent No.: US 6,614,955 B1
(45) Date of Patent: Sep. 2, 2003

(54) METHOD AND APPARATUS FOR AN EXTENDED WAVELENGTH RANGE COHERENT OPTICAL SPECTRUM ANALYZER

(75) Inventors: Wayne V. Sorin, Mountain View, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 44 days.

(21) Appl. No.: 09/644,062

(22) Filed: Aug. 22, 2000

(51) Int. Cl.[7] .............................. G02B 6/26; G02B 6/42
(52) U.S. Cl. .................. 385/22; 385/16; 385/1
(58) Field of Search .......................... 385/16, 18, 20, 385/22, 23, 24; 372/20, 38.03; 359/189, 190, 191, 192, 115, 117, 124, 129, 128

(56) References Cited

U.S. PATENT DOCUMENTS

| | | | | |
|---|---|---|---|---|
| 5,173,794 A | * | 12/1992 | Cheung et al. | 359/127 |
| 5,194,977 A | * | 3/1993 | Nishio | 359/128 |
| 5,394,489 A | * | 2/1995 | Koch | 385/14 |
| 5,539,559 A | * | 7/1996 | Cisneros et al. | 359/17 |
| 5,657,144 A | * | 8/1997 | Tanaka et al. | 359/128 |
| 5,715,075 A | * | 2/1998 | Tanaka et al. | 359/128 |
| 6,104,477 A | * | 8/2000 | Yoshida et al. | 356/73 |
| 6,172,782 B1 | * | 1/2001 | Kobayashi | 359/128 |
| 6,259,529 B1 | * | 7/2001 | Sorin et al. | 356/484 |
| 6,275,317 B1 | * | 8/2001 | Doerr et al. | 359/180 |
| 6,310,703 B1 | * | 10/2001 | Alavie et al. | 359/110 |
| 6,429,955 B1 | * | 8/2002 | Suemura et al. | 359/128 |

OTHER PUBLICATIONS

O. E. DeLange; "Optical Heterodyne Detection"; IEEE Spectrum, Oct. 1968, pp. 77–85.
Pamela L. Derry et al.; "Semiconductor Lasers"; Handbook of Optics. vol. 1, Second Edition, McGraw–Hill, Inc., 1995, Chapter 13.

* cited by examiner

Primary Examiner—Brian Healy
Assistant Examiner—Kevin S Wood

(57) ABSTRACT

An extended wavelength range light source for an optical instrument includes wavelength-tunable optical sources that generate optical signals, each of the optical sources having a distinct wavelength-tunable range which differs from the wavelength-tunable ranges of the other optical sources. A switch connected to each of the optical sources is configured to select any one of the optical sources.

21 Claims, 4 Drawing Sheets

METHOD AND APPARATUS FOR AN EXTENDED WAVELENGTH RANGE COHERENT OPTICAL SPECTRUM ANALYZER

BACKGROUND OF THE INVENTION

1. Field of the Invention

This invention relates generally to the field of optical instruments. More particularly, the invention is directed to an extended wavelength range light source in which a switch is used to select light generated by one of multiple tunable lasers with different tuning ranges.

2. Background of the Related Art

Conventional grating based optical spectrum analyzers (OSA) do not provide sufficient wavelength resolution for future Dense Wavelength Division Multiplexed (DWDM) communication systems. The wavelength resolution provided by current grating based OSA's is between 0.05 nm to 10 nm, whereas the required/preferred resolution for DWDM communication systems is much higher. The demand for better wavelength resolution for DWDM communication systems is driven by several factors. For example, with channel spacing ranging from 25 GHz to 50 GHz, adequate wavelength resolution is required to support both the signal spectra and the modulated spectra. Furthermore, a higher wavelength resolution improves the ability to resolve the spectral bandwidth, which includes the spectral side bands.

To address these problems, a proposed solution is that future OSAs will be based on coherent optical heterodyne spectrum analysis. A key component of this measurement technology is that a wavelength-tunable optical source, such as a laser, is used as a local oscillator (LO). One limitation of a tunable laser is that its wavelength tuning range is limited to a range of about 30–200 nm, which is a relatively small range compared to the normal spectral range for most OSAs. This small spectral range poses a problem to increasing the use and acceptance of the coherent heterodyne OSAs.

SUMMARY OF THE INVENTION

Therefore, it is a general objective of the invention to alleviate the problems and shortcomings identified above.

These and other objectives are achieved by providing in one aspect of the present invention a light source for an optical instrument. The light source includes wavelength-tunable optical sources that generate optical signals. Each of the optical sources has a distinct wavelength-tunable range that differs from the wavelength-tunable ranges of the other optical sources. The light source additionally includes a switch connected to each of the optical sources. The switch is configured to select any one of the optical sources and to transmit the optical signal from the selected optical source. The optical instrument may be a coherent heterodyne optical spectrum analyzer (OSA) that also includes a coherent heterodyne optical receiver that receives the optical signal from optical source selected by the switch and an external optical signal that is to be analyzed.

In another aspect of the invention, the optical instrument includes optical sources such that the distinct wavelength-tunable ranges of the optical sources at least partially overlap with at least one other of the optical sources.

In a further aspect of the invention, the distinct wavelength-tunable range of each of the optical sources is 30–200 nm.

In another aspect of the invention, the optical source is made using semiconductor materials and the tunable range of the optical sources, such as semiconductor lasers, is varied by varying the composition of the semiconductor materials.

In another aspect of the invention, the tunable optical sources are provided by using lasers as local oscillators.

In a further aspect of the invention, the optical sources are provided by using vertical cavity surface emitting lasers (VCSEL) with micro-machined mirrors so that the positions of the mirrors is adjustable to provide the tuning.

In another aspect of the invention, the switch includes a N×1 optical switch which outputs one optical signal from any one of N optical inputs.

In another aspect of the invention, the switch functionality is provided by a WDM combiner.

A further aspect of the present invention provides a method of extending the range of a light source for an optical instrument by generating optical signals each having a distinct wavelength-tunable range, selecting one of the optical signals and transmitting the selected one of the optical signals to the optical instrument.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION OF THE PREFERRED EMBODIMENT(S)

Figure 1:
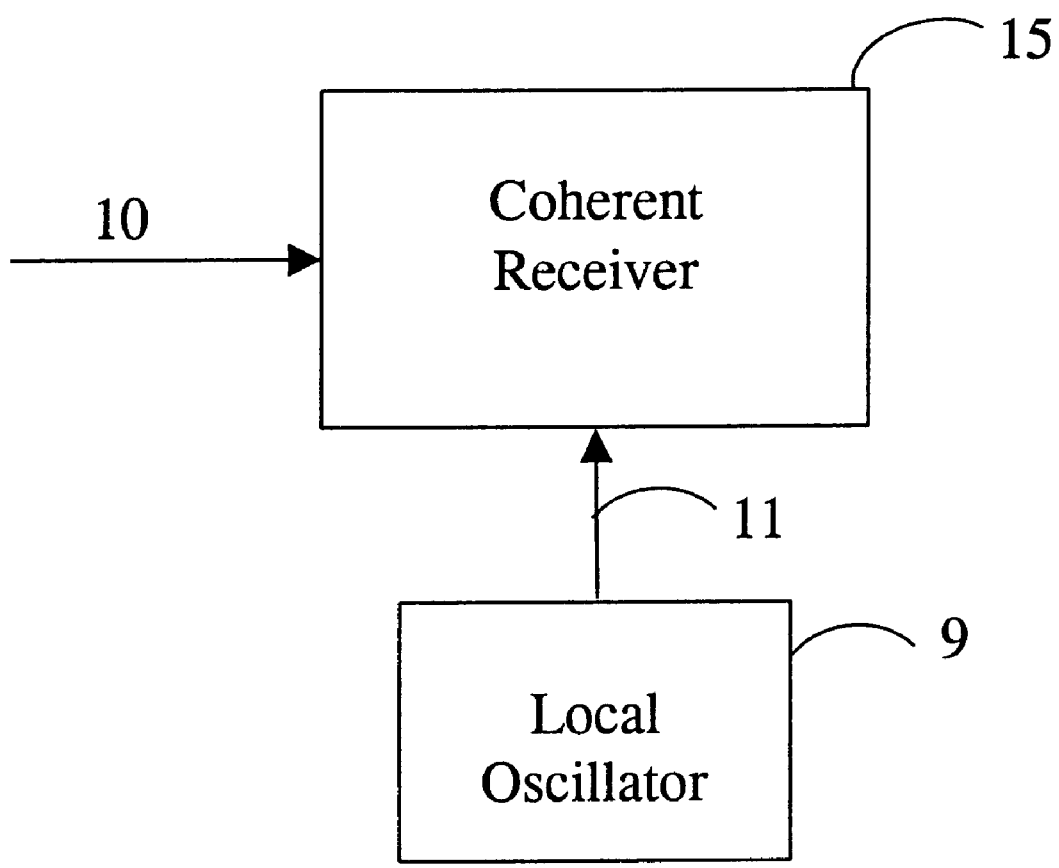
FIG. 1 is a block diagram illustrating the components of a conventional coherent heterodyne OSA with a light source.

FIG. 1 illustrates the high level components of a conventional coherent heterodyne OSA with a light source provided by, for example, a local oscillator laser. As discussed earlier, a key component of such an OSA is that a wavelength-tunable light source, such as a laser, is used a local oscillator. A coherent receiver 15 with polarization diversity and balanced detection receives both an external signal 10 and a local oscillator light beam 11 from a local oscillator 9 that serves as the wavelength-tunable light source for the OSA. One limitation of such a wavelength-tunable laser is that the wavelength-tunable range is limited to relatively small range compared to the desired spectral range for the OSA.

A coherent heterodyne receiver based OSA is desirable because a heterodyne receiver, such as that mentioned above, has several advantages over a conventional "direct detection" receiver. First, the conversion process of the heterodyne receiver provides gain so that the signal output of the detector may be made greater than any thermal or other detector noise. Second, the heterodyne receiver provides a much higher discrimination against background light or other unwanted radiation. Finally, the heterodyne receiver provides better performance, when compared to direct detectors, with respect to recovery of frequency or phase modulated signals. For a more detailed discussion of optical heterodyne detection and its advantages in light transmission, for example in enclosed paths over long terrestrial routes, please see the article entitled "Optical Heterodyne Detection" by O. E. DeLange in the journal IEEE Spectrum published in October 1968 at pages 77–85.

Figure 2:
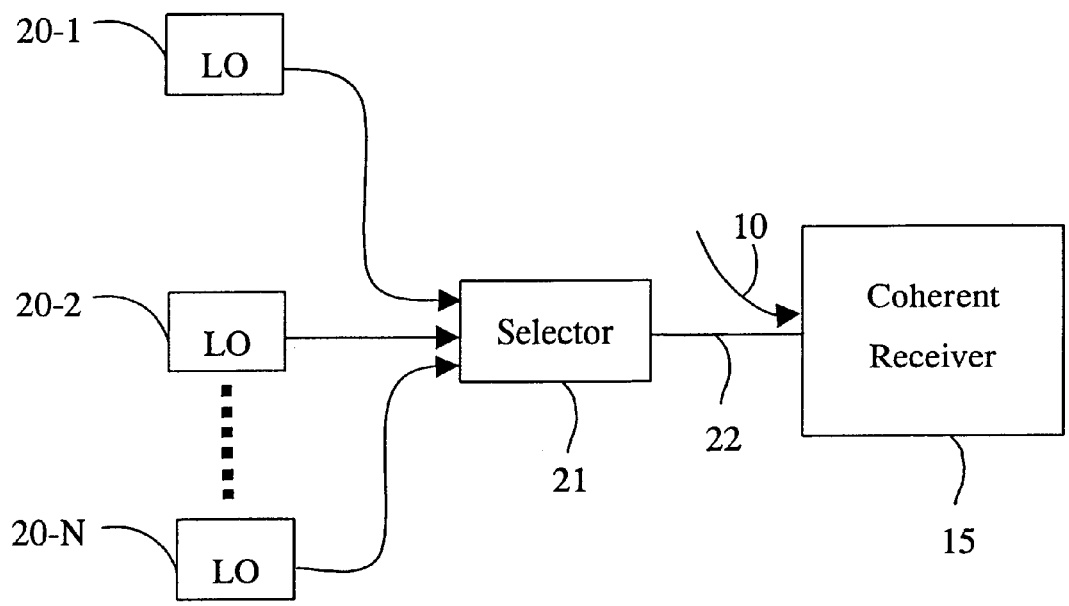
FIG. 2 is a block diagram showing the components of a preferred embodiment of an optical spectrum analyzer as an example of an optical instrument according to the present invention.

FIG. 2 is a block diagram that illustrates the preferred embodiment of the present invention in which a plurality of optical sources, such as wavelength-tunable local oscillators 20-1 to 20-N, are provided. Each of the wavelength-tunable local oscillators 20-1 to 20-N are connected to a selector (or switching means) 21 that is configured to select one of the wavelength-tunable local oscillators 20-1 to 20-N for transmitting an optical beam generated from the selected wavelength-tunable local oscillator 20-1 to 20-N.

Figure 3:
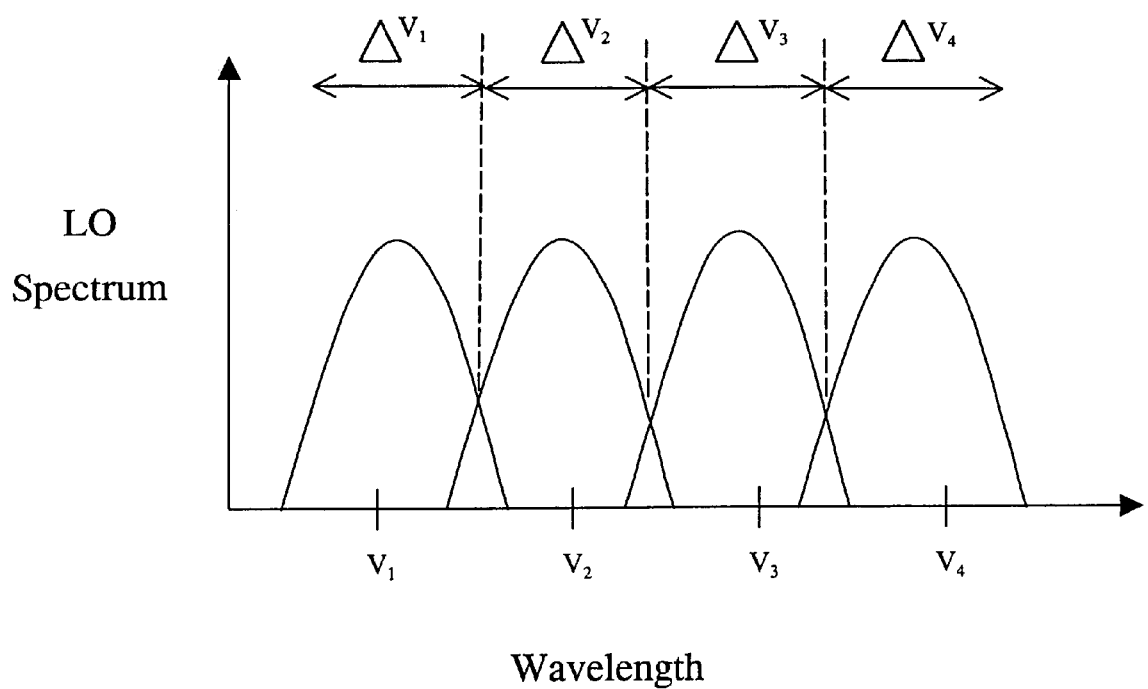
FIG. 3 is a diagram showing the relationship of optical power to wavelength for the various tunable wavelength ranges of the optical sources that provide the light source for the optical spectrum analyzer according to the present invention.

Furthermore, in the preferred embodiment, each of the local oscillators has a distinct wavelength range which is substantially different from the wavelength ranges of any of the other local oscillators even though there may be some partial overlap with adjacent ranges. As seen in FIG. 3, local oscillator 20-1 is configured to have a wavelength range $\Delta v1$, local oscillator 20-2 is configured to have a wavelength range $\Delta v2$, and so on with local oscillator 20-N configured to have a wavelength range of $\Delta vN$, such that each of the wavelength ranges $\Delta v1, \Delta v2, \ldots, \Delta vN$ is distinct.

In the preferred embodiment, the peak of wavelength range 20-1 is adjacent to the peak of the wavelength range of 20-2, which is in turn, adjacent to peak of the wavelength range of 20-3, and so on as illustrated in FIG. 3. Therefore, the spectrum of local oscillator 20-1 partially overlaps that of local oscillator 20-2 at one end of its wavelength range. The spectrum of local oscillator 20-2 partially overlaps that of local oscillator 20-1 at one end of the wavelength range of local oscillator 20-2 and at the other end of the wavelength range of local oscillator 20-2 the spectrum of local oscillator 20-2 overlaps that of local oscillator 20-3 and so on.

It is to be understood that while this partially overlapping LO spectrum in the preferred embodiment provides the largest possible continuous wavelength range for the plurality of local oscillators that provide the optical sources in accordance with the present invention, the present invention is not limited to such a selection of local oscillators. Rather, the present invention contemplates the use of at least two local oscillator such that each of the two local oscillators have a different wavelength-tunable range from each other. Therefore, the combined wavelength-tunable range of the two local oscillators is greater than that achievable by using a single local oscillator over the same wavelength ranges.

As noted above, the local oscillators 20-1 to 20-N are each connected to an optical selector 21 which is configured so that it can be used to select any one of the local oscillators 20-1 to 20-N. Therefore, the optical switch or selector 21 can be used to select any one of the local oscillators 20-1 to 20-N and provide an optical beam within the tunable wavelength range of any one of the local oscillators 20-1 to 20-N. Accordingly, the tunable wavelength of the plurality of local oscillators that comprise the light source provided by the present invention is greater than that achievable by using only one similar local oscillator over the same relevant wavelength range.

The optical beam 22 generated by one of the local oscillators 20-1 to 20-N is selected by the selector 21 so that the optical beam 22 from the selected local oscillator is provided to a coherent heterodyne receiver 15 along with the input external optical signal 10 which is to be analyzed by the OSA. The coherent receiver 15 includes other components that are well known to one skilled in the art and is configured to provide polarization diversity and balanced detection.

Figure 4:
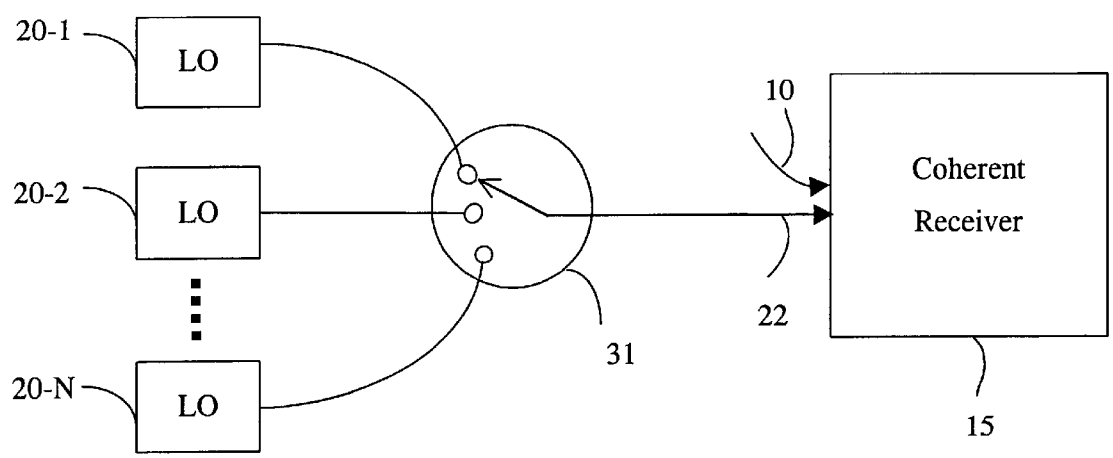
FIG. 4 is a block diagram showing the components of another preferred embodiment of the optical instrument according to the present invention.

FIG. 4 illustrates another preferred embodiment of the present invention in which the functionality of the selector 21 is provided by a N×1 switch 31 which permits the selection of the optical signal from any one of the N local oscillators 20-1 to 20-N so that the selected optical signal 22 is provided as the input to the coherent receiver 15 in a coherent heterodyne optical spectrum analyzer.

In addition, the present invention contemplates that the functionality of the selector 21 can be provided by a WDM combiner so that the WDM combiner can be used to provide the optical beam 22 from a selectable one of the local oscillators 20-1 to 20-N which provide the optical sources to the OSA of the present invention. In another embodiment, a fused coupler could be used to provide the functionality of the selector 21. The structure and use of WDM combiners and fused couplers are well known to one of skill in the art. For example, commercial WDM combiners are commercially manufactured by JDS Uniphase and several commercial manufacturers, such as Gould, ETEK, and AOFR, manufacture fused couplers. Comparatively, the WDM combiners provide better performance but are more expensive than fused couplers. The present invention also contemplates that the selector 21 functionality could be provided by a diffraction grating combiner.

In a preferred embodiment, the tunable LO optical sources are made using semiconductor materials whose tuning range can be tailored by adjusting the semiconductor material composition. The use of various semiconductor materials in a semiconductor laser is well known to those skilled in the art. For example, a discussion of semiconductor lasers, including the various semiconductor materials used in semiconductor lasers, is provided in chapter 13 of Handbook of Optics, Volume I, Michael Bass, Editor in Chief, published by McGraw-Hill Inc. (1995) whose disclosure is incorporated by reference herein, in its entirety.

Another good source of tunable lasers is the vertical cavity surface emitting laser (VCSEL) with micro-machined output mirrors whose position can be adjusted to provide the tuning. Description of such VCSEL devices can be found at chapter 13 of the Handbook of Optics referred to above. VCSELs are also commercially manufactured and one commercial tunable VCSEL is manufactured by Coretek Inc. and described on the internet at URL http://www.coretekinc.com/technology.html. This description provides that by combining the strengths of microelectromechanical (MEMS) techniques with VCSEL technology, Coretek is producing telecommunication devices capable of dynamic multi-spectrum wavelength selection and transmission over optical fibers.

Therefore, one aspect of the present invention provides that multiple semiconductor tunable lasers with different but slightly overlapping tuning ranges are combined together to form an extended wavelength range light source for a single coherent heterodyne OSA instrument. Therefore, multiple semiconductor tunable lasers having overlapping tuning ranges corresponding to different optical sources are combined together in a single light source for an OSA instrument to provide an OSA instrument that has a much wider tuning range than is achievable in an OSA instrument which has only one tunable source LO.

Other embodiments of the invention will be apparent to those skilled in the art from a consideration of the specification and the practice of the invention disclosed herein. It is intended that the specification be considered as exemplary only, with the true scope of the invention being indicated by the following claims.

What is claimed is:

1. An extended wavelength range light source for an optical measuring instrument, the light source comprising:
   wavelength-tunable optical sources that generate optical signals, each of the optical sources having a distinct wavelength-tunable range that differs from the wavelength-tunable ranges of the other optical sources; and
   a switch directly connected to the optical sources, and configured to select only one of any one of the optical sources at a given time and to transmit the optical signal from the selected one of the optical sources to the optical measuring instrument.

2. An extended wavelength range light source for an optical measuring instrument, the light source comprising:
   wavelength-tunable optical sources that generate optical signals, each of the optical sources having a distinct wavelength-tunable range that differs from the wavelength-tunable ranges of the other optical sources; and
   a switch directly connected to the optical sources, and configured to select one of any one of the optical sources and to transmit the optical signal from the selected one of the optical sources to the optical measuring instrument,
   wherein the distinct wavelength-tunable range of one of the optical sources at least partly overlaps the wavelength-tunable range of at least one other of the optical sources.

3. An extended wavelength range light source for an optical instrument, the light source comprising:
   wavelength-tunable optical sources that generate optical signals, each of the optical sources having a distinct wavelength-tunable range that differs from the wavelength-tunable ranges of the other optical sources; and
   a switch connected to the optical sources, and configured to select one of the optical sources and to transmit the optical signal from the selected one of the optical sources,
   wherein the distinct wavelength-tunable range is between 30–200 nm.

4. The light source according to claim 1, wherein ones of the optical sources comprise semiconductor materials.

5. An extended wavelength range light source for an optical measuring instrument, the light source comprising:
   wavelength-tunable optical sources that generate optical signals, each of the optical sources having a distinct wavelength-tunable range that differs from the wavelength-tunable ranges of the other optical sources; and
   a switch directly connected to the optical sources, and configured to select one of any one of the optical sources and to transmit the optical signal from the selected one of the optical sources to the optical measuring instrument,
   wherein ones of the optical sources comprise semiconductor materials, and
   wherein the tunable range of the optical sources is set by varying the composition of the semiconductor materials.

6. The light source according to claim 1, wherein the tunable optical sources include lasers.

7. An extended wavelength range light source for an optical measuring instrument, the light source comprising:
   wavelength-tunable optical sources that generate optical signals, each of the optical sources having a distinct wavelength-tunable range that differs from the wavelength-tunable ranges of the other optical sources; and
   a switch directly connected to the optical sources, and configured to select one of any one of the optical sources and to transmit the optical signal from the selected one of the optical sources to the optical measuring instrument,
   wherein the optical sources comprise vertical cavity surface emitting lasers (VCSELs) with micromachined mirrors, wherein positions of the mirrors are adjustable to tune the lasers.

8. An extended wavelength range light source for an optical measuring instrument, the light source comprising:
   wavelength-tunable optical sources that generate optical signals, each of the optical sources having a distinct wavelength-tunable range that differs from the wavelength-tunable ranges of the other optical sources; and
   a switch directly connected to the optical sources, and configured to select one of any one of the optical sources and to transmit the optical signal from the selected one of the optical sources to the optical measuring instrument,
   wherein the switching means includes an N×1 optical switch that outputs an optical signal from any one of N optical inputs.

9. An extended wavelength range light source for an optical measuring instrument, the light source comprising:
   wavelength-tunable optical sources that generate optical signals, each of the optical sources having a distinct wavelength-tunable range that differs from the wavelength-tunable ranges of the other optical sources; and
   a switch directly connected to the optical sources, and configured to select one of any one of the optical sources and to transmit the optical signal from the selected one of the optical sources to the optical measuring instrument,
   wherein the switching means includes a Wavelength Division Multiplexed (WDM) combiner.

10. A method of extending the range of a light source for an optical instrument, the method comprising:
    generating optical signals each having distinct wavelength-tunable ranges;
    selecting only one of any one of the optical signals at a given time; and
    transmitting the selected one of the optical signals to the optical instrument,
    wherein the step of generating a plurality of optical signals includes providing a plurality of local oscillator semiconductor laser signals.

11. A method of extending the range of a light source for an optical measuring instrument, the method comprising:

providing wavelength-tunable optical sources directly connected to a switch;

generating, by the wavelength-tunable optical sources, optical signals each having distinct wavelength-tunable ranges;

selecting, by the switch, one of any one of the optical signals; and transmitting the selected one of the optical signals to the optical measuring instrument, wherein generating the optical signals includes providing vertical cavity surface emitting laser (VCSEL) signals.

12. A method of extending the range of a light source for an optical measuring instrument, the method comprising:

providing wavelength-tunable optical sources directly connected to a switch;

generating, by the wavelength-tunable optical sources, optical signals each having distinct wavelength-tunable ranges;

selecting, by the switch, one of any one of the optical signals; and transmitting the selected one of the optical signals to the optical measuring instrument, wherein selecting one of the optical signals includes combining the optical signals and selecting one of optical signals using a Wave Division Multiplexing (WDM) combiner.

13. A method of extending the range of a light source for an optical instrument, the method comprising:

generating optical signals each having distinct wavelength-tunable ranges;

selecting one of the optical signals; and transmitting the selected one of the optical signals to the optical instrument, wherein selecting one of the optical signals includes a fused coupling step.

14. An extended wavelength range coherent heterodyne optical spectrum analyzer (OSA) comprising:

wavelength-tunable optical sources each having a distinct wavelength-tunable range;

switching means for switching between the optical sources so that one of the optical sources is selected by the switching means to transmit an optical signal from the selected one of the optical sources; and a coherent heterodyne optical receiving means for receiving the optical signal from the selected optical source and an external optical signal to be analyzed by the OSA.

15. The optical spectrum analyzer according to claim 14, wherein the switching means comprises a WDM combiner.

16. The optical spectrum analyzer according to claim 14, wherein the switching means comprises a N×1 optical switch that outputs an optical signal from any one of N optical inputs.

17. The optical spectrum analyzer according to claim 14, wherein the switching means includes a fused coupler.

18. The optical spectrum analyzer according to claim 14, wherein ones of the optical sources includes a vertical cavity surface emitting laser (VCSEL).

19. The optical spectrum analyzer according to claim 15, wherein ones of the optical sources includes a semiconductor laser.

20. An extended wavelength range coherent optical spectrum analyzer (OSA), comprising:

wavelength-tunable optical sources that generate optical signals, each of the optical sources having a distinct wavelength-tunable range that differs from the wavelength-tunable ranges of the other optical sources;

a selector connected to each of the optical sources, the selector configured to select any one of the optical sources; and a coherent heterodyne optical receiver that receives the optical signal from the optical source selected by the selector and an external optical signal to be analyzed by the OSA.

21. The optical spectrum analyzer according to claim 20, wherein the coherent heterodyne optical receiver is configured to provide polarization diversity and balanced detection.

* * * * *